(12) United States Patent
Kasahara et al.

(10) Patent No.: US 8,305,470 B2
(45) Date of Patent: Nov. 6, 2012

(54) IMAGING DEVICE, SETTING-VALUE CHANGING METHOD, AND COMPUTER PROGRAM PRODUCT

(75) Inventors: Ryosuke Kasahara, Kanagawa (JP); Tetsuya Sasaki, Kanagawa (JP); Go Maruyama, Tokyo (JP); Hiroyoshi Sekiguchi, Kanagawa (JP); Masahiko Itoh, Tokyo (JP); Xue Li, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 348 days.

(21) Appl. No.: 12/585,869

(22) Filed: Sep. 28, 2009

(65) Prior Publication Data
US 2010/0079622 A1 Apr. 1, 2010

(30) Foreign Application Priority Data
Sep. 29, 2008 (JP) .................... 2008-250267

(51) Int. Cl.
*H04N 5/202* (2006.01)
(52) U.S. Cl. ........................................ 348/254
(58) Field of Classification Search .............. 348/254
See application file for complete search history.

(56) References Cited

U.S. PATENT DOCUMENTS

| | | | | |
|---|---|---|---|---|
| 7,728,888 | B2 * | 6/2010 | Ono | 348/257 |
| 2006/0103743 | A1 * | 5/2006 | Ono | 348/257 |
| 2007/0273776 | A1 * | 11/2007 | Lee | 348/254 |
| 2008/0094493 | A1 * | 4/2008 | Igarashi | 348/254 |
| 2009/0201417 | A1 | 8/2009 | Kasahara | |

FOREIGN PATENT DOCUMENTS

JP 2807928 7/1998

OTHER PUBLICATIONS

An English language abstract of Japanese Publication No. JP 4-247777, published Sep. 3, 1992.

* cited by examiner

*Primary Examiner* — Chieh M Fan
*Assistant Examiner* — Dillon Durnford Geszvain
(74) *Attorney, Agent, or Firm* — Harness, Dickey & Pierce, P.L.C.

(57) ABSTRACT

An imaging device includes an imaging element that takes an image of a target object and output an image signal corresponding to the image; a storage unit that stores therein a zero-point adjustment reference value; a brightness detecting unit that detects a brightness of the target object; and a reference-value changing unit that changes the zero-point adjustment reference value when the brightness detected by the brightness detecting unit is equal to or lower than a threshold. A zero point in a level of the image signal output from the imaging element is adjusted by using the zero-point adjustment reference value stored in the storage unit.

6 Claims, 8 Drawing Sheets

| 0 | −0.5 | 0 | −0.5 | 0 |
|---|---|---|---|---|
| −0.5 | 0 | −1.0 | 0 | −0.5 |
| 0 | −1.0 | 9.0 | −1.0 | 0 |
| −0.5 | 0 | −1.0 | 0 | −0.5 |
| 0 | −0.5 | 0 | −0.5 | 0 |

IMAGING DEVICE, SETTING-VALUE CHANGING METHOD, AND COMPUTER PROGRAM PRODUCT

CROSS-REFERENCE TO RELATED APPLICATIONS

The present application claims priority to and incorporates by reference the entire contents of Japanese Patent Application No. 2008-250267 filed in Japan on Sep. 29, 2008.

BACKGROUND OF THE INVENTION

1. Field of the Invention

The present invention relates to a technology for adjustment of a zero point in a level of an image signal output from an imaging device.

2. Description of the Related Art

Imaging devices that include charge-coupled devices (CCD) to take digital images are known in the art. With such charge-coupled device (CCD) imaging devices, when an image of a target object is taken in a dark environment, for example, in the presence of backlight, the brightness of the obtained image is not adequate. One approach to create an image with adequate brightness, as disclosed in Japanese Patent No. 2807928, is to increase the gain of a gain control amplifier (GCA) circuit using an automatic gain control (AGC) circuit and amplify the image signal output from the CCD imaging device using the GCA circuit that has the increased gain.

Output of an imaging sensor, such as a CCD imaging device, contains a certain amount of noise; therefore, an image that is created based on the output also contains noise. To reduce noise, if the output level of the imaging sensor is lower than a threshold, the zero-point level of an analog-to-digital converter (ADC) circuit is adjusted by performing a black-level control (BLC) so that a signal having a level equal to or lower than the threshold cannot be output from the imaging sensor.

More precisely, if the output level of the imaging sensor is equal to or lower than the threshold, the output from the imaging sensor is cut off. Therefore, when an image is taken in a dark environment where illuminance is equal to or lower than the threshold (hereinafter, "sensitivity limit"), the obtained image is too dark to be seen by the naked eye.

SUMMARY OF THE INVENTION

It is an object of the present invention to at least partially solve the problems in the conventional technology.

According to an aspect of the present invention, there is provided an imaging device including an imaging element configured to take an image of a target object and output an image signal corresponding to the image; a storage unit configured to store therein a zero-point adjustment reference value, wherein a zero point in a level of the image signal output from the imaging element is adjusted by using the zero-point adjustment reference value; a brightness detecting unit configured to detect a brightness of the target object; and a reference-value changing unit configured to change the zero-point adjustment reference value stored in the storage unit when the brightness detected by the brightness detecting unit is equal to or lower than a threshold.

According to another aspect of the present invention, there is provided a method of changing a zero-point adjustment reference value performed by an imaging device, wherein the imaging device includes an imaging element configured to take an image of a target object and output an image signal corresponding to the image and a storage unit configured to store therein the zero-point adjustment reference value and a zero point in a level of the image signal output from the imaging element is adjusted by using the zero-point adjustment reference value. The method including detecting brightness of the target object; and changing the zero-point adjustment reference value stored in the storage unit when the brightness detected at the detecting is equal to or lower than a threshold.

According to still another aspect of the present invention, there is provided a computer program product that includes a computer-readable recording medium and computer program stored on the recording medium which when executed on a computer causes the computer to function as a storage unit configured to store therein a zero-point adjustment reference value, wherein, when an imaging element takes an image of a target object and outputs an image signal corresponding to the image, a zero point in a level of the image signal output from the imaging element is adjusted by using the zero-point adjustment reference value; a brightness detecting unit configured to detect a brightness of the target object; and a reference-value changing unit configured to change the zero-point adjustment reference value when the brightness detected by the brightness detecting unit is equal to or lower than a threshold.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
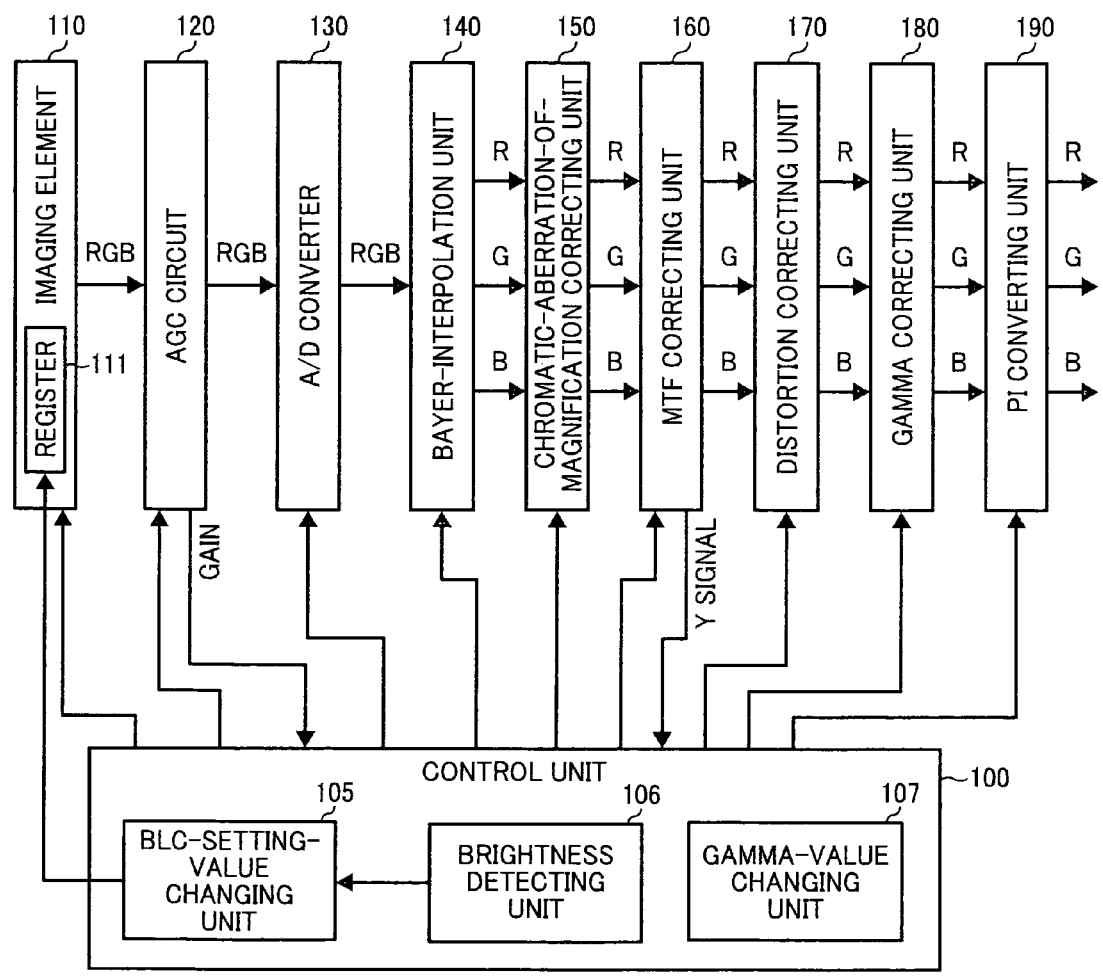
FIG. 1 is a block diagram of an image processing system included in an imaging device according to a first embodiment of the present invention.

FIG. 1 is a block diagram of an image processing system included in an imaging device according to a first embodiment of the present invention.

The imaging device includes, although not shown in FIG. 1, an operation unit, an image display unit, an optical system, and a mechanical system that adjusts a shutter speed and a lens diaphragm. The imaging device in the first embodiment is assumed to be a camera that is attached to a vehicle; however, applications of the imaging device are not limited thereto.

As shown in FIG. 1, the image processing system includes a control unit 100, an imaging element 110, an AGC circuit 120, an analog-to-digital (A/D) converter 130, a Bayer-interpolation unit 140, a chromatic-aberration-of-magnification correcting unit 150, a modulation transfer function (MTF) correcting unit 160, a distortion correcting unit 170, a gamma correcting unit 180, and a progressive-to-interlaced (PI) converting unit 190.

The imaging element 110 includes, for example, CCDs or complementary metal-oxide semiconductor (CMOS) sensors. The CCDs or the CMOS sensors create an optical image by means of a wide-angle optical system having a large chromatic aberration of magnification and a large distortion (not shown) and convert the optical image into an electric signal (image signal). The imaging element 110 includes a chromatic filter based on Bayer arrangement. The imaging element 110 outputs, by means of the chromatic filter, RGB image data based on Bayer arrangement sequentially as progressive signals under control of control signals (e.g., clock signal, horizontal/vertical synchronization signal) that are received from the control unit 100.

The imaging element 110 includes a register 111 that stores therein a black-level control (BLC) setting value. The BLC setting value is a reference value that is used for adjusting the zero point in the level of an analog image signal output from the imaging element 110. The BLC setting value is a variable value. As described later, a BLC-setting-value changing unit 105 of the control unit 100 rewrites the BLC setting value. Adjustment of the zero point of the output level is called black-level control (BLC).

The control unit 100 controls operations of the units of the imaging device by sending control signals (e.g., clock signal, horizontal/vertical synchronization signal) to a target unit with pipeline processing. The control unit 100, as shown in FIG. 1, includes the BLC-setting-value changing unit 105, a brightness detecting unit 106, and a gamma-value changing unit 107.

The brightness detecting unit 106 detects a brightness of acquired image data representing a target object. More particularly, the brightness detecting unit 106 can be configured to use information indicative of gain received from the AGC circuit 120 to detect the brightness. The image signal (signal of acquired image data) that is output from the imaging element 110 is amplified by the AGC circuit 120 before the image signal is input to the A/D converter 130 for A/D conversion. The gain of the AGC circuit 120 is set properly, taking the balance into consideration between a target brightness of and an amount of noise on a screen. Brightness and noise are in a trade-off relation. That is, the brightness decreases as the amount of noise increases. Therefore, it is possible to determine the brightness using the gain of the AGC circuit 120.

Alternatively, the brightness detecting unit 106 can be configured to use shutter speed or lens diaphragm to detect the brightness. An image with a desired brightness can be created by adjusting the gain of the AGC circuit 120, the shutter speed of the imaging element 110, and the lens diaphragm of the imaging element 110. Therefore, it is possible to determine the brightness using the shutter speed and the lens diaphragm.

Still alternatively, the brightness detecting unit 106 can be configured to use a Y signal indicative of luminance that is received from the MTF correcting unit 160 to calculate the brightness. More particularly, the brightness detecting unit 106 calculates the brightness using a sum of luminance of an entire screen or a sum of luminance that is obtained after weighting the target object that is expected to be positioned in the center of the screen.

Still alternatively, an illuminance sensor can be arranged to detect the brightness, the brightness detected by the illuminance sensor can be supplied to the brightness detecting unit 106, and the brightness detecting unit 106 can be made to decide the brightness.

The above-described manners of detecting the brightness are merely examples. Some other manners of detecting the brightness of the target object can be used, instead.

If the brightness detected by the brightness detecting unit 106 is equal to or lower than a threshold, the BLC-setting-value changing unit 105 changes the BLC setting value that is stored in the register 111 of the imaging element 110 to increase the sensitivity limit of the imaging element 110.

Figure 2A:
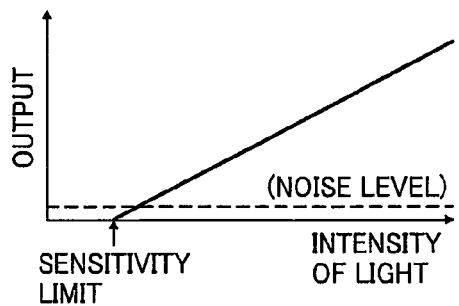
FIG. 2A is a graph that explains a relation between intensity of light and level of an analog image signal output from an imaging element in a conventional imaging device.
Figure 2B:
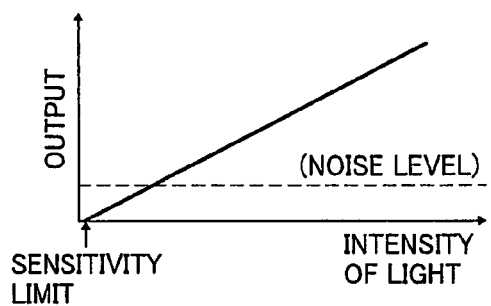
FIG. 2B is a graph that explains a relation between intensity of light and level of an analog image signal output from an imaging element included in the imaging device according to the first embodiment.

The technique of increasing the sensitivity limit by changing the BLC setting value is described in detail below. FIG. 2A is a graph that explains a relation between intensity of light and level of an analog image signal output from an imaging element in a conventional imaging device. FIG. 2B is a graph that explains a relation between intensity of light and level of the analog image signal output from the imaging element 110 in the imaging device according to the first embodiment.

If the brightness of the screen is not adequate, in the conventional technique, the gain of the AGC circuit is increased to increase the output level of the imaging sensor, thereby creating an image with an adequate brightness even in dark environments. As described above, however, the output from the imaging element contains a certain amount of noise. To reduce noise on the screen, in the conventional technique, the zero-point level of the ADC is adjusted so that a signal having a level equal to or lower than the threshold cannot be output. The conventional technique has a drawback that an unrecognizable image is created if an image is taken in a dark environment with brightness equal to or lower than the sensitivity limit.

In the conventional technique, the gain of the AGC circuit is controlled to increase the sensitivity limit; therefore, as shown in FIG. 2A, it is impossible to increase the sensitivity limit without increasing noise.

However, an increase of the sensitivity limit is necessary in some cases even when noise increases. Specifically, when the imaging device is a camera that is attached to a vehicle as assumed in the embodiment, because inside the vehicle is generally dark, most of images will be taken in dark environments. The user wishes an image recognizable but having noise rather than an unrecognizable image. To satisfy such a need, in the technique according to the embodiment, if the brightness is equal to or lower than the threshold, the BLC setting value is changed and the zero point in the level of the analog image signal output from the imaging element 110 is adjusted by using the changed BLC setting value, thereby increasing the sensitivity limit.

If the sensitivity limit increases as the BLC values decreases, the BLC-setting-value changing unit 105 decreases the BLC setting value when the brightness is equal to or lower than the threshold.

On the other hand, if the sensitivity limit increases as the BLC values increases, the BLC-setting-value changing unit 105 increases the BLC setting value when the brightness is equal to or lower than the threshold.

The threshold of the brightness, by referring to which the BLC-setting-value changing unit 105 changes the BLC setting value, can be set as appropriately.

Assume, for example, the sensitivity of the imaging element 110 is 32× and the brightness detected by the brightness detecting unit 106, i.e., the average luminance of the acquired image is equal to lower than a threshold that is set to 60. In this case, the BLC-setting-value changing unit 105 increases the BLC setting value stored in the register 111 of the imaging element 110 from the reference value of 80 to 88.

The BLC-setting-value changing unit 105 can be configured to decrease the BLC setting value from 88 to the reference value of 80 when the brightness is higher than the threshold.

Referring back to FIG. 1, when the BLC-setting-value changing unit 105 of the control unit 100 changes the BLC setting value, the gamma-value changing unit 107 changes the gamma value and sends that gamma value to the gamma correcting unit 180. As described later, the gamma correcting unit 180 uses the new gamma value to perform gamma correction.

The BLC-setting-value changing unit 105 changes the BLC setting value to increase the sensitivity limit in dark environments. More particularly, the sensitivity limit increases because the zero point in the level of the image signal output from the imaging element 110 shifts by the BLC using the changed BLC setting value. It means that a change of the BLC setting value deforms the gamma curve away from an appropriate curve. In the first embodiment, the gamma-value changing unit 107 changes the gamma value based on the change in the BLC setting value, thereby deforming the gamma curve back to the appropriate curve. After that, the gamma correcting unit 180 performs gamma correction using the appropriate gamma curve.

Figure 3:
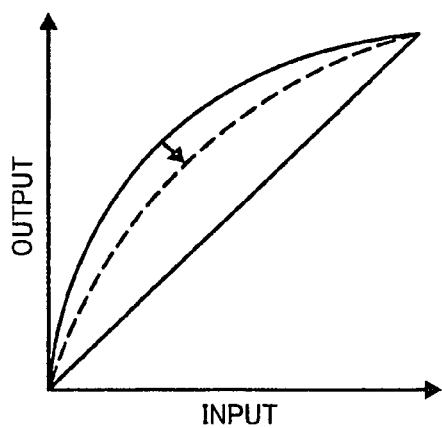
FIG. 3 depicts a gamma curve.

The gamma curve after deformation caused by the change in the BLC setting value is indicated by a continuous line in FIG. 3. The gamma-value changing unit 107 changes the gamma value so that the gamma correcting unit 180 performs gamma correction using the appropriate gamma curve indicated by a dotted line in FIG. 3.

Referring back to FIG. 1, the AGC circuit 120 amplifies the analog image signal that is received from the imaging element 110 to a predetermined value. The gain of the AGC circuit 120 is set appropriately, taking it into consideration the balance between the target brightness of and the amount of noise on the screen.

Upon receiving the amplified analog signal indicative of an RGB image based on Bayer arrangement from the AGC circuit 120, the A/D converter 130 converts the analog signal to the digital signal (image data) and sends the digital signal to the Bayer-interpolation unit 140. The image data is made up of, for example, 8-bit red, green, and blue.

Upon receiving the RGB image data based on Bayer arrangement in the form of the digital signal, the Bayer-interpolation unit 140 creates image data having all the points of coordinates for each of RGB colors using linear interpolation and sends the created image data to the chromatic-aberration-of-magnification correcting unit 150.

Figure 4A:
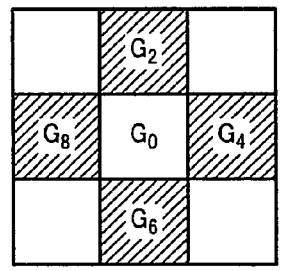
FIGS. 4A to 4C are schematic diagrams of chromatic filters based on Bayer arrangement.
Figure 4B:
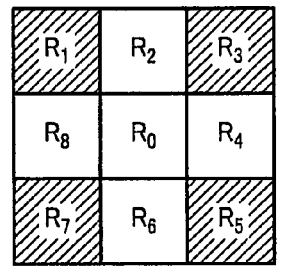
Figure 4C:
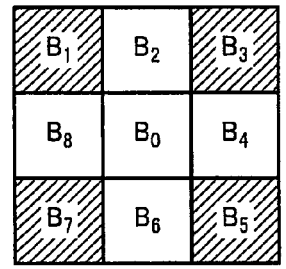

FIGS. 4A to 4C are schematic diagrams of chromatic filters based on Bayer arrangement. FIG. 4A is a schematic diagram of a chromatic filter for a green signal; FIG. 4B is a schematic diagram of a chromatic filter for a red signal; FIG. 4C is a schematic diagram of a chromatic filter for a blue signal. A value $G_o$ is calculated using Equation (1):

$$G_0=(G_2+G_4+G_6+G_8)/4 \quad (1)$$

Values $R_2$, $R_4$, $R_6$, $R_8$, and $R_0$ are calculated using Equations (2), (3), (4), (5), and (6), respectively:

$$R_2=(R_1+R_3)/2 \quad (2)$$

$$R_4=(R_3+R_5)/2 \quad (3)$$

$$R_6=(R_5+R_7)/2 \quad (4)$$

$$R_8=(R_1+R_7)/2 \quad (5)$$

$$R_0=(R_1+R_3+R_5+R_7)/4 \quad (6)$$

Values $B_2$, $B_4$, $B_6$, $B_8$, and $B_o$ are calculated in the manner similar to the calculation for $R_2$, $R_4$, $R_6$, $R_8$, and $R_0$, and therefore the description about the calculation for B2, B4, B6, B8, and B0 is not repeated.

Although the imaging element in the first embodiment employs the chromatic filter based on Bayer arrangement, similar effect can be obtained by employing other chromatic filters. For example, a chromatic filter based on CMYG arrangement or a chromatic filter based on RGB+Ir (infrared color) arrangement, can be employed instead of the chromatic filter based on Bayer arrangement. Because a memory having a lower latency or a 4-port random access memory (RAM) adequate when a chromatic filter based on 4-color arrangement is employed, the chromatic filter based on 4-color arrangement is advantageous as compared to an imaging element having a chromatic filter based on 3-color arrangement, for example, RGB arrangement.

Referring back to FIG. 1, upon receiving the Bayer-interpolated red image data, the Bayer-interpolated green image data, and the Bayer-interpolated blue image data, the chromatic-aberration-of-magnification correcting unit 150 transforms coordinates of each image data using a predetermined polynomial or the like (coordinate transformation for correcting chromatic aberration of magnification) and outputs the red image data, the green image data, and the blue image data each having the corrected chromatic aberration of magnification. Each of the color components has a different chromatic aberration of magnification; however, magnitudes of the chromatic aberrations are small. Therefore, the coordinate transformation for correcting chromatic aberration of magnification can be performed using a low-capacity and low-latency memory or a low-capacity memory having a plurality of ports (e.g., static random access memory (SRAM)).

Upon receiving the RGB image data having the corrected chromatic aberration of magnification, the MTF correcting unit 160 performs an MTF correction using a finite impulse response (FIR) filter 164 and outputs the MTF-corrected RGB image data.

Figure 5:
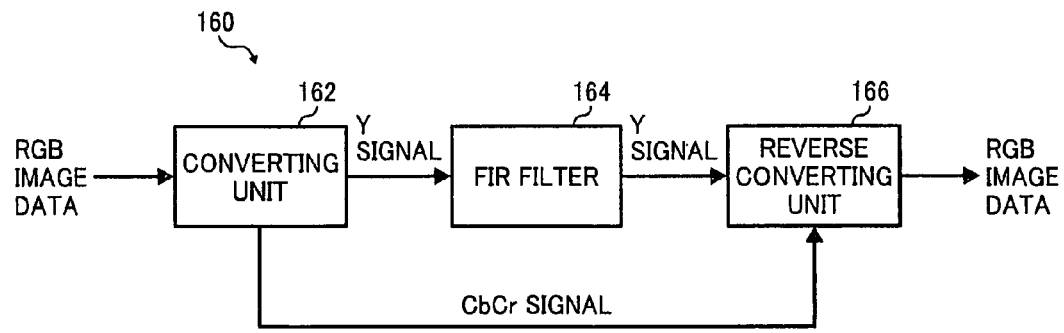
FIG. 5 is a block diagram of an MTF correcting unit shown in FIG. 1.

FIG. 5 is a block diagram of the MTF correcting unit 160. The MTF correcting unit 160 includes a converting unit 162, the FIR filter 164, and a reverse converting unit 166. The converting unit 162 converts the RGB image data into YCbCr image data using Equations (7), (8), and (9):

$$Y=0.299R+0.587G+0.114B \quad (7)$$

$$Cr=0.500R-0.419G-0.081B \quad (8)$$

$$Cb=-0.169R-0.332G+0.500B \quad (9)$$

Figures 6, 7:
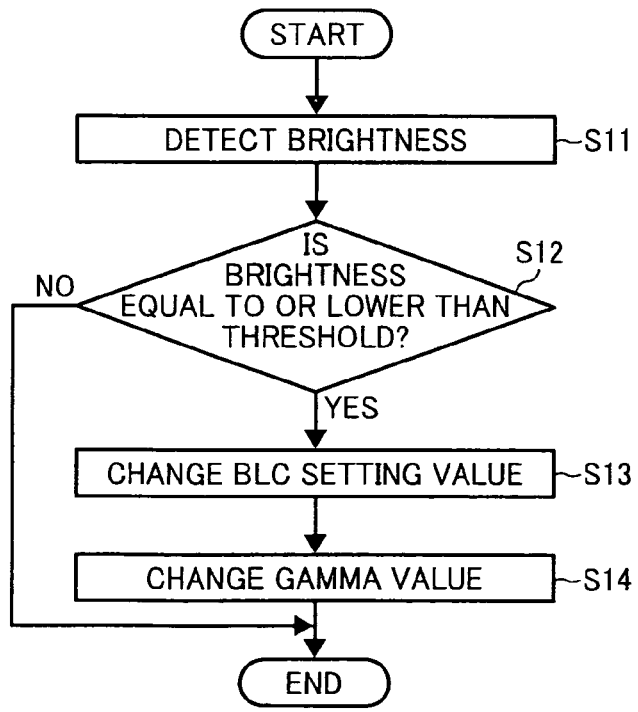
FIG. 6 is a schematic diagram of an exemplary FIR filter.
FIG. 7 is a flowchart of a process of changing a BLC setting value according to the first embodiment.

The FIR filter 164 is a 5×5 filter. The FIR filter 164 receives only the Y signal, which is indicative of luminance, out of YCbCr signals and performs MTF correction in a predetermined manner. FIG. 6 is a schematic diagram of an exemplary FIR filter. Because only the Y signal is filtered out, i.e., only the Y signal is subjected to MTF correction, amplification of chromatic noise is suppressed; therefore, a high-quality image is created. Because the target signal to be filtered out is the Y signal, it is necessary to perform the MTF correction after performing correction of the chromatic aberration of magnification. Although the MTF correction can be performed after distortion correction, it is preferable to perform the MTF correction after the correction of the chromatic aberration of magnification before the distortion correction. As described later, a calculation error is likely to occur in the distortion correction because a transformation distance in coordinates is large. If the MTF correction is performed after the distortion correction, such an error is amplified and then the amplified error brings an adverse effect on the image.

Upon receiving the CbCr signals and the MTF-corrected the Y signal, the reverse converting unit 166 reversely converts the CbCr signals and the MTF-corrected Y signal into the RGB image data using Equations (10), (11), and (12) and outputs the RGB image data:

$$R = Y + 1.402Cr \qquad (10)$$

$$G = Y - 0.714Cr - 0.344Cb \qquad (11)$$

$$B = Y + 1.772Cb \qquad (12)$$

Referring back to FIG. 1, upon receiving the RGB image data that is subjected to the chromatic-aberration-of-magnification correction and the MTF correction, the distortion correcting unit 170 performs coordinate transformation (coordinate transformation for correcting distortion) using a predetermined polynomial or the like and outputs the distortion-corrected RGB image data. The manner of the coordinate transformation on each chromatic component of red, green, and blue is the same. The magnitudes of distortions are larger than the magnitudes of chromatic aberration of magnification. The distortions of the chromatic components of red, green, and blue are equal. Therefore, a memory used in the coordinate transformation for correcting the distortion needs a large capacity, as compared to a memory used in the chromatic-aberration-of-magnification correction, enough to store therein data for one screen but needs a high latency because only a single port is required. The memory for the distortion correction is, for example, a dynamic random access memory (DRAM). It is possible to perform the chromatic-aberration-of-magnification correction and the distortion correction in parallel.

Upon receiving the RGB image data from the distortion correcting unit 170, the gamma correcting unit 180 performs gamma correction by using, for example, lookup tables for individual colors of red, green, and blue and outputs the gamma-corrected RGB image data. The gamma correcting unit 180 uses the lookup tables corresponding to the changed gamma value that is changed in the above-described manner by the gamma-value changing unit 107.

The RGB image data output from the gamma correcting unit 180 is progressive signals in a sequence of scanning lines. Upon receiving the progressive signals from the gamma correcting unit 180, the PI converting unit 190 converts the progressive signals into interlaced signals and sends the interlaced signals to a National Television System Committee (NTSC)-based display device (not shown).

A process of changing the BLC setting value performed by the imaging device according to the first embodiment is described below. FIG. 7 is a flowchart of the process of changing the BLC setting value according to the first embodiment.

The brightness detecting unit 106 detects brightness of the image of the target object (Step S11). Any above-described techniques can be used to detect the brightness. The BLC-setting-value changing unit 105 determines whether the detected brightness is equal to or lower than the threshold (step S12). If the brightness is equal to or lower than the threshold (Yes at Step S12), the BLC-setting-value changing unit 105 changes the BLC setting value, which is stored in the register 111 of the imaging element 110, from the reference value (Step S13). After that, the zero point in the level of the image signal output from the imaging element 110 is adjusted using the changed BLC setting value. As a result, the sensitivity limit of the imaging element 110 increases.

When the BLC setting value is changed, the gamma-value changing unit 107 changes the gamma value to a value corresponding to the changed BLC setting value (Step S14). After that, the gamma correcting unit 180 performs gamma correction on the image signal using the changed gamma value so that the appropriate gamma curve is obtained.

If the brightness is higher than the threshold (No at Step S12), the processes of Steps S13 and S14 are skipped.

Figure 8:
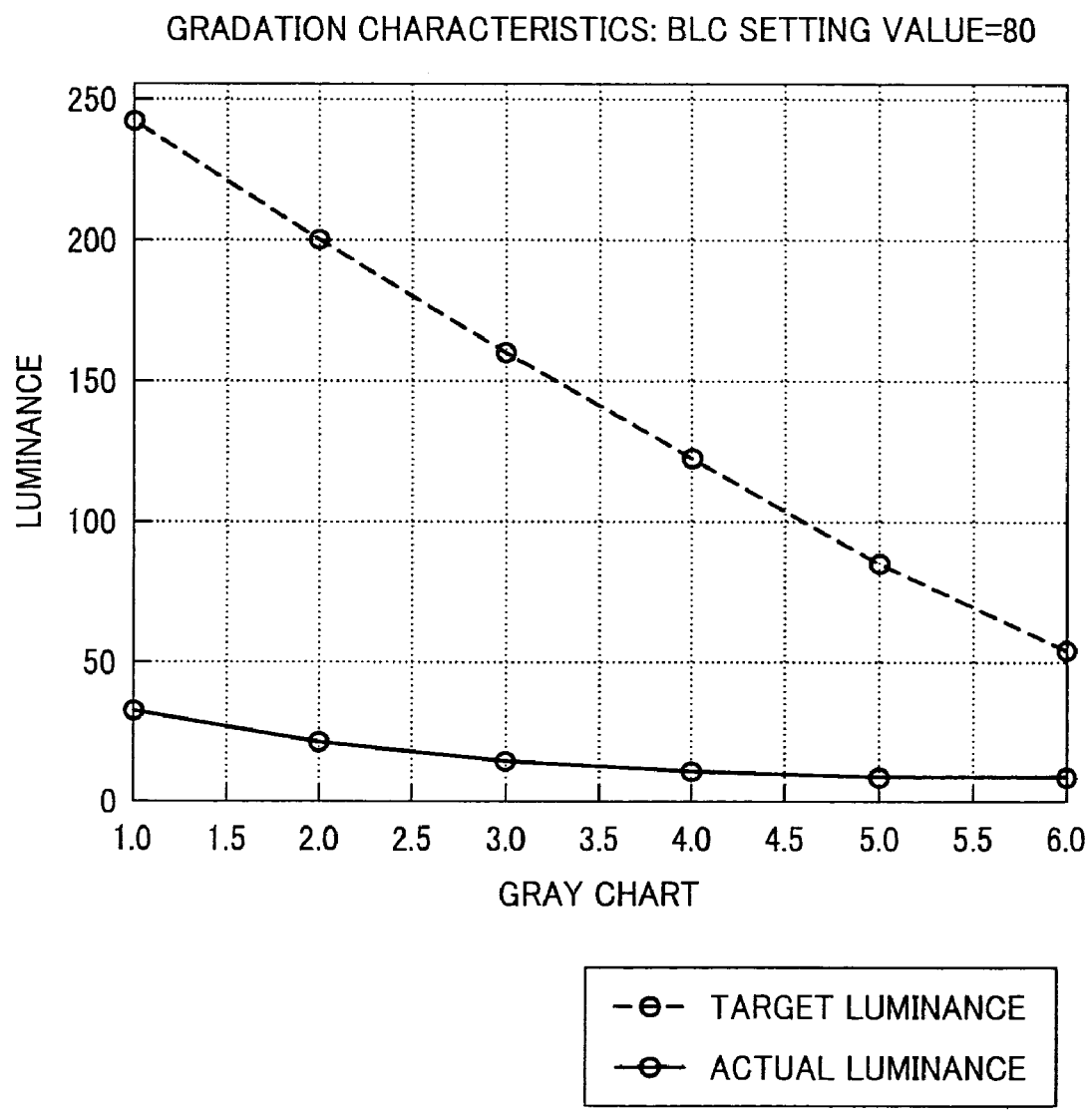
FIG. 8 is a graph depicting results of experiments in which the BLC setting value is set to the reference value of 80.
Figure 9:
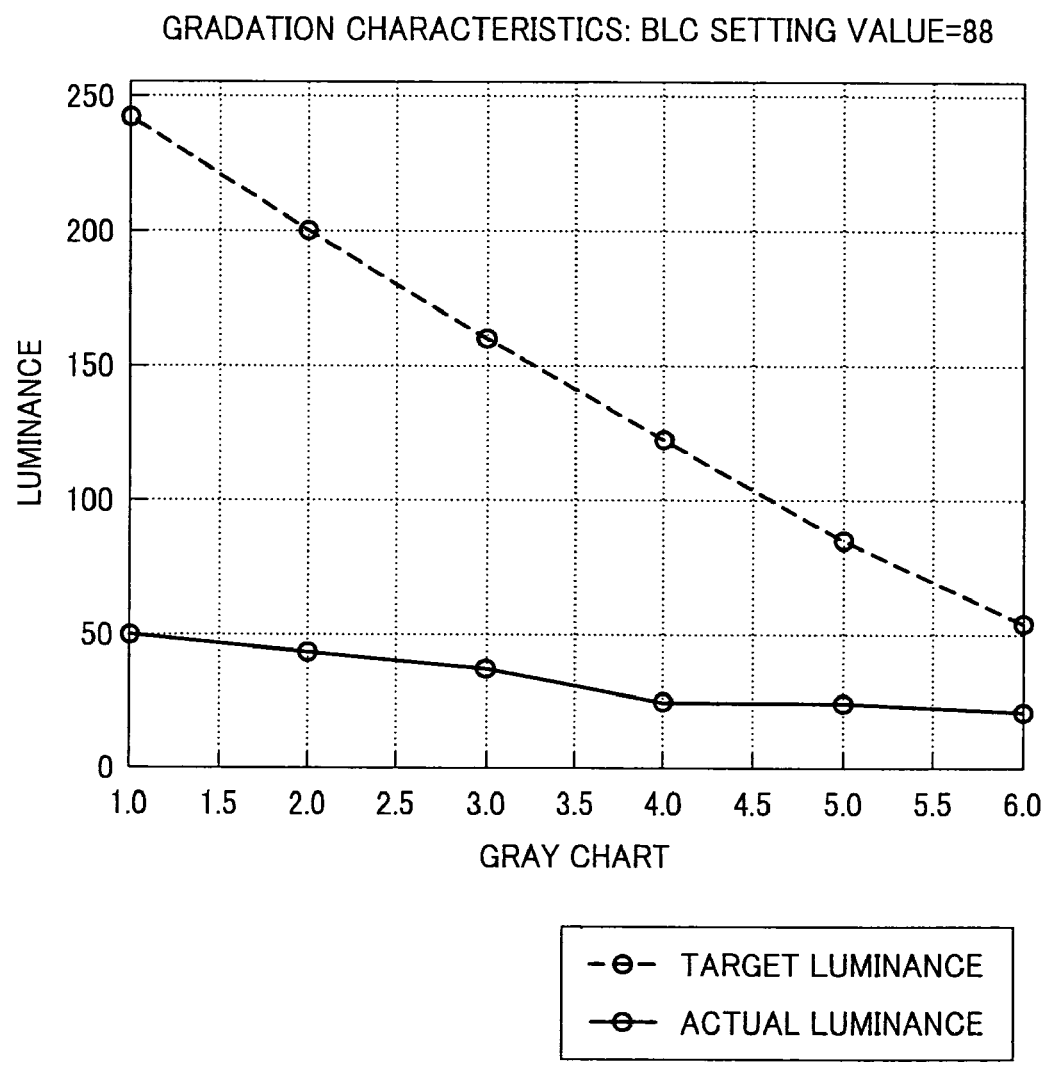
FIG. 9 is a graph depicting results of experiments in which the BLC setting value is changed to 88.

FIGS. 8 and 9 are graphs that depict results of experiments. FIG. 8 is a graph that explains a relation between gray chart and luminance when the BLC setting value is set to the reference value of 80. FIG. 9 is a graph that explains a relation between gray chart and luminance when the BLC setting value is changed to 88 from 80. Dotted lines in FIGS. 8 and 9 represent target luminance; continuous lines represent actual luminance. It is clear from FIGS. 8 and 9 that the sensitivity where the BLC setting value is 88 (FIG. 9) is higher than the sensitivity where the BLC setting value is 80 (FIG. 8). In other words, a gap between the actual luminance and the target luminance where the BLC setting value is 88 is smaller than that the gap where the BLC setting value is 80.

In this manner, the imaging device according to the first embodiment detects the brightness of the image of the target object. If the detected brightness is equal to or lower than the threshold, the imaging device changes the BLC setting value and then adjusts the zero point in the level of the image signal output from the imaging element 110 using the changed BLC setting value, thereby increasing the sensitivity limit of the imaging element 110. With this configuration, it is possible to take a recognizable image at a high sensitivity even in dark environments with the imaging device.

When the BLC setting value is changed, the gamma value is also changed to a value corresponding to the changed BLC setting value. With this configuration, although the gamma curve is deformed away from an appropriate curve by the zero-point adjustment using the changed BLC setting value, the gamma curve is deformed back to the appropriate curve using the changed gamma value. As a result, a high-quality image is created.

The imaging device according to the first embodiment changes the BLC setting value when the detected brightness of the image of the target object is equal to or lower than the threshold. An imaging device according to a second embodiment of the present invention, in contrast, changes the BLC setting value only when the detected brightness of the image of the target object is equal to or lower than the threshold and the gain of the AGC circuit 120 is at the upper limit.

Figure 10:
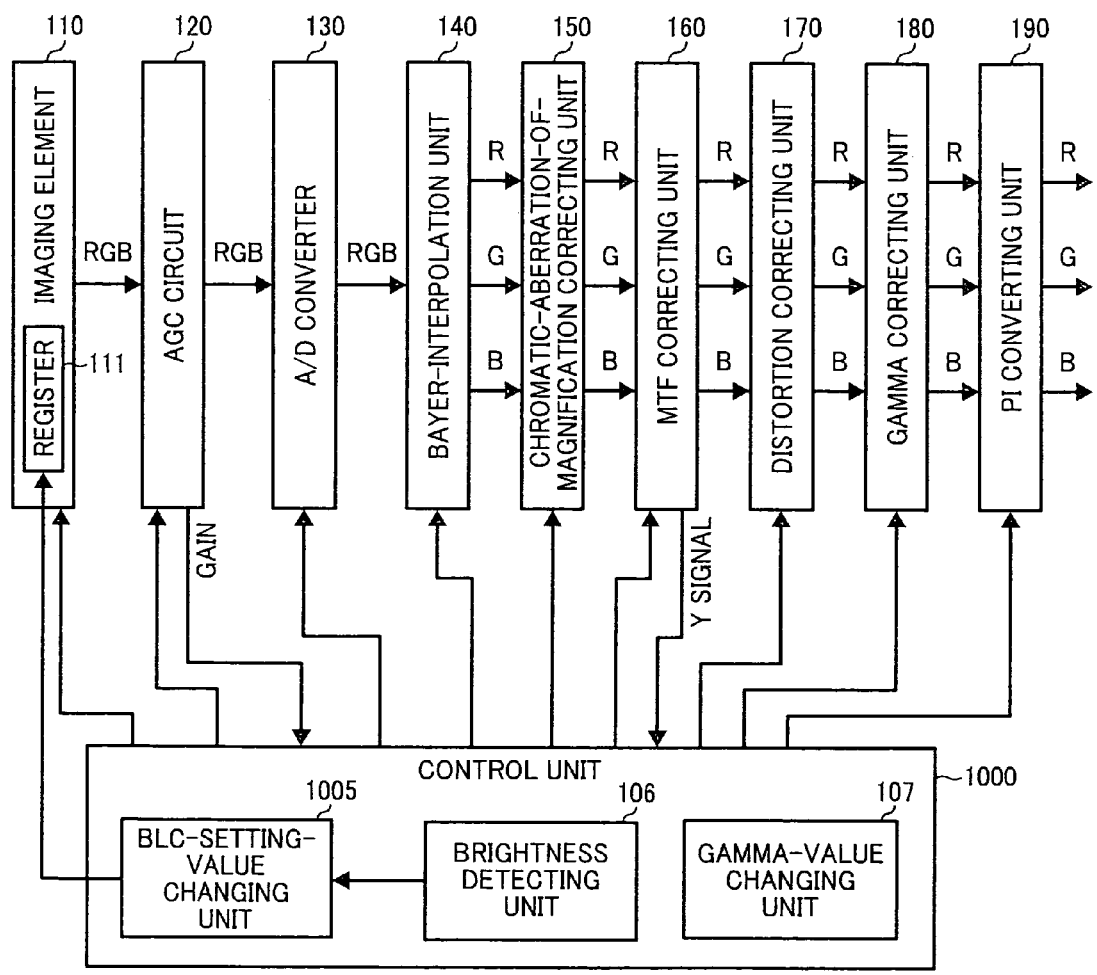
FIG. 10 is a block diagram of an image processing system included in an imaging device according to a second embodiment of the present invention.

FIG. 10 is a block diagram of an image processing system included in the imaging device according to the second embodiment. The image processing system according to the second embodiment includes a control unit 1000, the imaging element 110, the AGC circuit 120, the A/D converter 130, the Bayer-interpolation unit 140, the chromatic-aberration-of-magnification correcting unit 150, the MTF correcting unit 160, the distortion correcting unit 170, the gamma correcting unit 180, and the PI converting unit 190. The configuration and function of each of the imaging element 110, the AGC circuit 120, the A/D converter 130, the Bayer-interpolation unit 140, the chromatic-aberration-of-magnification correcting unit 150, the MTF correcting unit 160, the distortion correcting unit 170, the gamma correcting unit 180, and the PI converting unit 190 is the same as those in the first embodiment; therefore, the same description is not repeated.

The control unit 1000 controls operations of the units of the imaging device by sending control signals (e.g., clock signal, horizontal/vertical synchronization signal) to a target unit with pipeline processing. The control unit 1000, as shown in FIG. 10, includes a BLC-setting-value changing unit 1005, the brightness detecting unit 106, and the gamma-value changing unit 107. The configuration and function of each of the brightness detecting unit 106 and the gamma-value changing unit 107 is the same as those in the first embodiment.

The brightness detecting unit 106 in the second embodiment detects the brightness in a manner other than the manner using information indicative of the gain that is received from the AGC circuit 120. More particularly, the brightness detecting unit 106 determines the brightness using the shutter speed or the lens diaphragm, calculates the brightness using the Y signal indicative of luminance that is received from the MTF correcting unit 160 and a sum of luminance of an entire screen or a sum of luminance that is obtained after weighting the target object that is expected to be positioned in the center of the screen, or detects the brightness using information that is received from the illuminance sensor.

The BLC-setting-value changing unit 1005 changes the BLC setting value only when the detected brightness of the image of the target object is equal to or lower than the threshold and the gain of the AGC circuit 120 is at the upper limit.

Figure 11:
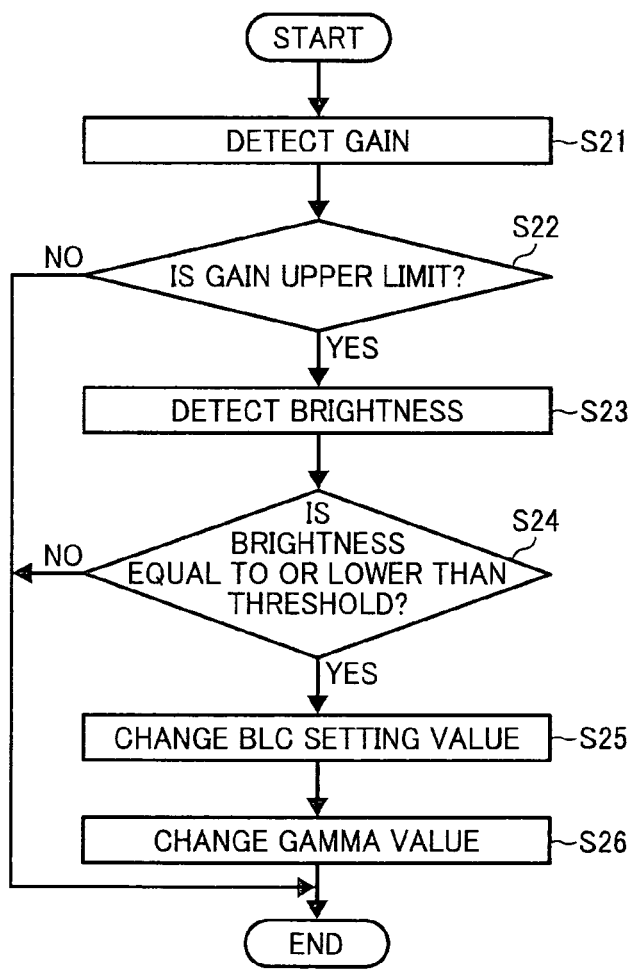
FIG. 11 is a flowchart of a process of changing the BLC setting value according to the second embodiment.

When the sensitivity limit is increased through the zero-point adjustment using the changed BLC setting value, noise appears on the created image. In the second embodiment, if the imaging device takes an image in a dark environment, the imaging device firstly tries to create a bright and noiseless image by increasing the gain of the AGC circuit 120. If the gain is at the upper limit, however, it is impossible to create a brighter image through the gain control. If the gain is at the upper limit, the imaging device then detects the brightness of the target object. If the detected brightness is equal to or lower than the threshold, the imaging device changes the BLC setting value and increases the sensitivity limit of the imaging element 110 using the changed BLC setting value, thereby creating a brighter image. Because the BLT setting value is changed only when a brighter image cannot be created through manners other than the change of the BLT setting value, an increase of noise appearing on the created image is suppressed A process of changing the BLC setting value performed by the imaging device according to the second embodiment is described below. FIG. 11 is a flowchart of the process of changing the BLC setting value according to the second embodiment.

The BLC-setting-value changing unit 1005 detects the gain of the AGC circuit 120 (Step S21). The BLC-setting-value changing unit 1005 determines whether the gain is at the upper limit of the AGC circuit 120 (Step S22). The upper limit is prestored in a memory (not shown) of the control unit 1000.

If the detected gain is at the upper limit (Yes at Step S22), the brightness detecting unit 106 detects the brightness of the image representing the target object (Step S23). The processes from Steps S24 to S26 are then performed in the same manner as the processes from Steps S12 to S14 in the first embodiment.

If the detected gain is lower than the upper limit (No at Step S22), the processes from Steps S24 to S26 are skipped.

In this manner, the imaging device according to the second embodiment changes the BLC setting value only when the detected brightness of the image of the target object is equal to or lower than the threshold and the gain of the AGC circuit 120 is at the upper limit. That is, because the BLT setting value is changed only when a brighter image cannot be created through manners other than the change of the BLT setting value, an increase of noise appearing on the created image is suppressed.

A BLC setting-value changing program that is executed by the imaging device according to the first embodiment or the second embodiment is stored in a recording medium, such as a read only memory (ROM).

The BLC setting-value changing program can be stored, in the form of a file that is installable and executable on an imaging device, in a recording medium readable by the imaging device, such as a compact disk-read only memory (CD-ROM), a flexible disk (FD), a compact disk-recordable (CD-R), and a digital versatile disk (DVD).

On the other hand, the BLC setting-value changing program can be stored in a computer connected to the imaging device via a network such as the Internet, and downloaded to the imaging device via the network. The BLC setting-value changing program can be delivered or distributed via a network such as the Internet.

The BLC setting-value changing program is, for example, made up of modules that implement the units of the imaging device, such as the BLC-setting-value changing unit 105 or 1005, the brightness detecting unit 106, and the gamma-value changing unit 107 as software. When a central processing unit (CPU) (processor) reads the BLC setting-value changing program from the ROM and executes the read BLC setting-value changing program, the above modules are loaded and created on a main memory thereby implementing the units of the imaging device.

The embodiments are not limited to the present invention. It is allowable to modify the components without departing from the scope of the present invention. Moreover, various modifications can be made to the present invention by combining some components that are disclosed in the above-described embodiments. It is allowable to remove one or more components from the components of the above-described imaging device. It is also allowable to combine components of different embodiments together.

According to an aspect of the present invention, even when an image of a target object is taken in a dark environment, a high-sensitive image is created by detecting brightness of the target object; changing, if the detected brightness is equal to or lower than a threshold, a setting value; and adjusting the zero point in the level of the signal output from an imaging element using the changed setting value.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device, comprising:
an imaging element configured to take an image of a target object and output an analog image signal corresponding to the image;

a storage unit configured to store therein a zero-point adjustment reference value, the zero-point adjustment reference value being a value to adjust a zero point in a level of the analog image signal output from the imaging element, the storage unit including a register of the imaging element;

a brightness detecting unit configured to detect a brightness of the target object; and a reference-value changing unit configured to change the zero-point adjustment reference value stored in the storage unit when the brightness detected by the brightness detecting unit is equal to or lower than a threshold.

2. The imaging device according to claim 1, further comprising:

a gamma correcting unit configured to perform gamma correction on the image signal using a gamma value; and a gamma-value changing unit configured to change the gamma value when the reference-value changing unit has changed the zero-point adjustment reference value.

3. The imaging device according to claim 1, further comprising:

an amplifying unit configured to amplify the image signal by a gain, wherein the reference-value changing unit is configured to change the zero-point adjustment reference value only when the gain by which the amplifying unit amplifies the image signal has reached an upper limit.

4. The imaging device according to claim 3, wherein the reference-value changing unit is configured to change the zero-point adjustment reference value only when the brightness detected by the brightness detecting unit is equal to or lower than the threshold and the gain by which the amplifying unit amplifies the image signal has reached the upper limit.

5. A method of changing a zero-point adjustment reference value performed by an imaging device, the imaging device including an imaging element configured to take an image of a target object and output an analog image signal corresponding to the image and a storage unit configured to store therein the zero-point adjustment reference value and a zero point in a level of the analog image signal output from the imaging element is adjusted by using the zero-point adjustment reference value, the method comprising:

detecting brightness of the target object; and changing the zero-point adjustment reference value stored in the storage unit when the brightness detected at the detecting is equal to or lower than a threshold, the storage unit including a register of the imaging element.

6. A computer program product that includes a non-transitory computer-readable recording medium and computer program stored on the recording medium which when executed on a computer causes the computer to function as:

a storage unit configured to store therein a zero-point adjustment reference value, the zero-point adjustment reference value being a value to adjust a zero point in a level of an analog image signal output from an imaging element, the analog image signal corresponding to an image of a target object, the storage unit including a register of the imaging element;

a brightness detecting unit configured to detect a brightness of the target object; and a reference-value changing unit configured to change the zero-point adjustment reference value when the brightness detected by the brightness detecting unit is equal to or lower than a threshold.

* * * * *